United States Patent [19]

Lian et al.

[11] Patent Number: 5,587,872
[45] Date of Patent: Dec. 24, 1996

[54] ELECTROCHEMICAL CELL HAVING SYMMETRIC INORGANIC ELECTRODES

[75] Inventors: Ke K. Lian, Northbrook; Changming Li, Vernon Hills; Richard H. Jung, Park Ridge; Joseph G. Kincs, Arlington Heights, all of Ill.

[73] Assignee: Motorola, Inc., Schaumburg, Ill.

[21] Appl. No.: 547,821

[22] Filed: Oct. 25, 1995

[51] Int. Cl.⁶ .................................................. H01G 9/02
[52] U.S. Cl. ..................... 361/525; 361/512; 361/523; 361/528; 361/532; 29/25.03
[58] Field of Search ..................... 361/525, 503, 361/502, 508, 512, 516, 522, 523, 528, 530, 532, 541; 205/781.5, 783, 785, 787.5, 790, 794, 794.5; 204/424, 426, 421, 427, 430; 29/25.03

[56] References Cited

U.S. PATENT DOCUMENTS

| | | | |
|---|---|---|---|
| 4,500,667 | 2/1985 | Polak et al. | 524/406 |
| 4,705,545 | 11/1987 | Polak et al. | 55/158 |
| 4,824,528 | 4/1989 | Polak et al. | 205/784 |

FOREIGN PATENT DOCUMENTS

| | | |
|---|---|---|
| 0078404 | 9/1982 | European Pat. Off. . |
| 0078404 | 5/1983 | European Pat. Off. . |

OTHER PUBLICATIONS

Electroanalytical Chemistry and Interfacial Electrochemistry Elsevier, et al., J. Electroanal. Chem., App. 1–5 1971.
Ruthenium Dioxide: A New Electrode Material . . . , Galizzioli, et al., Laboratory of Electrochemistry, Journal of Applied Electrochemistry Nov. 13, 1973.
Ruthenium Dioxide: A New Electrode Material . . . Part I., Galizzioli, et al, Journal of Applied Electrochemistry Jun. 12, 1973.
Oxide Films at Ruthenium Electrodes, Hadzi–Jordanov, et al., J. Electrochem. Soc. Sep. 1978.
The A–C Response of Iridium Oxide Films, Glarum, et al., Bell Laboratories, J. Electrochem. Soc. Jul. 1980.

Primary Examiner—Leo P. Picard
Assistant Examiner—Anthony Dinkins
Attorney, Agent, or Firm—Kenneth M. Massaroni

[57] ABSTRACT

An electrochemical cell is fabricated by providing two symmetric electrodes and a solid polymer electrolyte disposed therebetween. The symmetric electrodes, anode and cathode, are made from materials such as ruthenium, iridium, cobalt, zinc, bismuth, cadmium, silver, and oxides thereof. The solid polymer electrolyte is in intimate contact with both the anode and cathode, and is made from a polymeric support structure such as polyvinylalcohol, having dispersed therein a proton conducting electrolyte active species.

8 Claims, 3 Drawing Sheets

ELECTROCHEMICAL CELL HAVING SYMMETRIC INORGANIC ELECTRODES

TECHNICAL FIELD

This invention relates in general to electrochemical cells, and more particularly to cells having symmetric inorganic electrodes.

BACKGROUND OF THE INVENTION

Energy generation and storage has long been a subject of study and development. Of special importance is the storage of electrical energy in a compact form that can be readily charged and discharged such as rechargeable batteries and/or electrochemical capacitors. High power, high current pulse rechargeable electrochemical charge storage devices are very important in applications using electrical pulses, such as digital communications, power tools, and portable computers, to name but a few applications. In these devices, high electrochemical kinetic rate, long cycle life of the electrode, and good ionic conductivity of the electrolyte are all extremely important considerations.

Most high powered electrochemical charge storage devices, such as electrochemical capacitors, use aqueous electrolytes since aqueous electrolytes are known to have the highest ionic conductivities. However, aqueous electrolytes also result in problems when handling and packaging the devices. This is due to the fact that aqueous electrolytes are generally liquid and hence have a propensity to leak out of the packages into which they are sealed. Furthermore, many high power electrochemical energy storage devices demonstrate poor cycle life due to dendrite growth on the electrodes thereof. Dendrite growth results in the formation of pinholes between the electrodes, thus resulting in short circuits which significantly reduce the cycle life of the battery, and which represent a severe limitation in the state of the conventional art.

Electrochemical capacitors can generally be divided into two categories: Double layer capacitors in which the interfacial capacitance at the electrode/electrolyte interface can be modeled as two parallel sheets of charge; and pseudo, or super capacitor devices in which charge transfer between the electrode and the electrolyte occurs over a wide potential range. These charge transfers are the result of primarily, secondary, and tertiary oxidations/reduction reactions between the electrode and the electrolyte. These types of electrolyte capacitors are now being developed for high-pulse power applications, such as those described hereinabove.

Pseudocapacitor devices are disclosed in, for example, European Patent Application No. 82109061.0 to Dwight Craig. The Craig reference relates to pseudocapacitor devices having aqueous electrolytes therein. As such, the devices are subject to the limitations of aqueous based systems such as those described hereinabove.

Accordingly, there exists a need to provide novel electrochemical capacitor devices free of the limitations inherent to aqueous systems. Such devices should have high ionic conductivities, provide high power, and be fabricated of relatively environmentally benign materials. Moreover, fabrications of such devices should be simple, inexpensive, and readily repeatable.

DETAILED DESCRIPTION OF THE PREFERRED EMBODIMENT

Figure 1:
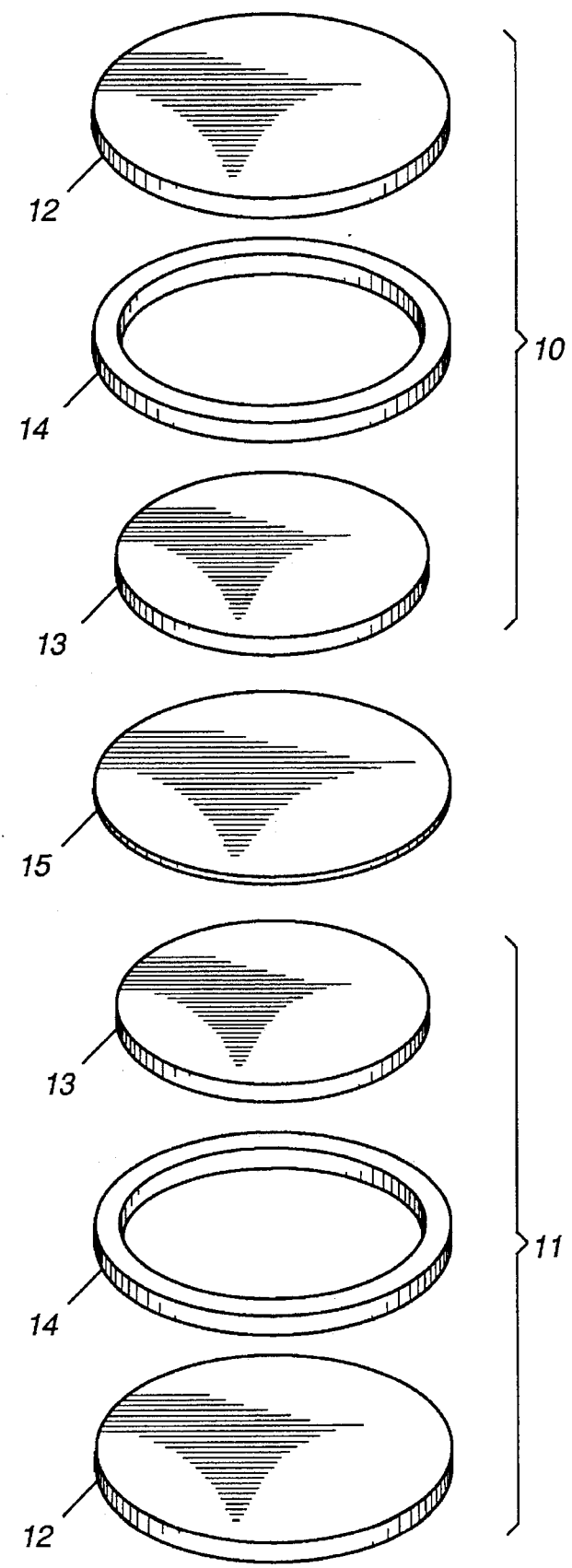
FIG. 1 is a exploded view of an electrochemical energy storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an energy storage device such as electrochemical charge storage device fabricated from a pair of symmetric electrode assemblies 10. Each assembly 10, 11, includes an electrode 13, which electrodes are symmetric. As used herein, the term "symmetric electrodes" refers to the fact that the two electrodes are made from the same composition, i.e., they are made from the same materials. Examples of materials from which the symmetric electrodes may be made include iron, molybdenum, ruthenium, iridium, cobalt, zinc, bismuth, cadmium, lead, silver, vanadium, tungsten, alloys of the foregoing, oxides of the foregoing, and combinations thereof. As such, both the anode and the cathode of the device disclosed and illustrated in FIG. 1 are made from the same material. Further, as used herein, the term "electrochemical cell" includes, but is not limited to, a battery, an electrochemical capacitor, i.e., an electrochemical capacitor characterized by oxidation/reduction reactions or a BAT-CAP™, a hybrid device which exhibits the characteristics of a battery and a capacitor.

Each electrode assembly may further include a current collector 12 which is electrically conducting. Current collector 12 is preferably chemically inert to the electrolyte 15 which is described in greater detail hereinbelow. A housing or gasket 14 may be employed to house the electrode and the electrolyte, but is optional. The electrolyte 15 is sandwiched between the electrodes and is in the form of a film, such as a polymeric, which may also serve as a separator between the two electrodes. This structure thus affords free and unobstructed movement to the ions in the electrolytes. The combination electrolytes/separator prevents contact between the opposing electrodes since such a condition would result in a short circuit and malfunction of the cell.

In a preferred embodiment of the instant invention, the electrolyte is a polymer electrolyte which is in contact with and disposed between both the anode and the cathode. The polymer electrolyte comprises a polymeric support structure selected from the group of polyethylene oxide, polyvinyl alcohol, polyvinyl acetate, polyacrylamide, poly(vinyl pyrolidone), poly(2-vinylpyridene) poly(4-vinyl pyridene) and polyethylene imine and preferably comprises polyvinylalcohol. Dispersed within the polymer support structure is a proton conducting electrolyte active species. In this case, the proton conducting electrolyte active species may be selected from the group of materials consisting of $H_3PO_4$ (phosphoric acid), $H_2SO_4$ (sulfuric acid), HCl (hydrochloric acid), and combinations thereof. More particularly the polymer electrolyte is made from a polyvinyl resin and phosphoric acid. Polyvinyl resins are those polymeric materials generally considered to include polymers derived from monomers having the structure:

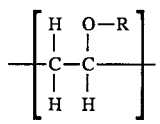

in which R represents hydrogen, an alkyl, a halogen, or other groups. Such monomers can be prepared by addition of the appropriate compound to acetylene. Properties vary with chemical structure, crystallinity, and molecular weight. For example, polyvinyl alcohol (PVA) has good mechanical properties and which can be formed into strong films, tubes, and fibers that are highly resistant to hydrocarbon solvents. Although PVA is one of the few water soluble polymers, it may be rendered insoluble in water by the use of crosslinking agents. Two groups of polyvinyl products are available; those formed by the essentially complete hydrolysis polyvinyl acetate, and those formed by incomplete hydrolysis. The former may be plasticized with water or glycols and molded or extruded into films, tubes, and filaments which are resistant to hydrocarbons. Polyvinylacetate is a leathery, colorless thermoplastic material which softens at relatively low temperatures and which is relatively stable to light and oxygen. These polymers are clear and noncrystalline with the chief applications being used as adhesives and binders for water-based paints. Prior art mixtures of PVA with phosphoric acid have been known to produce membranes useful in gas separation technology. For example, U.S. Pat. No. 4,500,667 to Polack, et al, incorporated herein by reference, describes gas permeable PVA/$H_3PO_4$ films and methods for preparing the same.

The electrolyte of the instant invention was prepared by first making an aqueous solution of PVA at a concentration range of 1–20% PVA by weight. The optimal range was found to be between 5–10% by weight. The PVA is added to water heated to a temperature of between 50°–100° C., and is stirred until all the PVA is dissolved. PVA is commercially available in a wide range of molecular weights. It has been found that PVA obtained from Aldrich Chemical, Inc., in the range of 80,000–140,000 molecular weight is a preferred material. Other molecular weights in the range of 30,000–50,000 to 80,000 are also useful. It is to be understood that other materials with even higher molecular weights may also be advantageously employed. In determining the optimum molecular weight for a particular application, it is to be understood that higher molecular weights are desirable for electrolytes which will be employed in stand alone systems, while lower electrolyte weights of the polymer are desirable when the electrolyte is to be impregnated with other materials which may add to the mechanical stability of the system. Those skilled in the art of polymers will realize that higher molecular weight polymers tend to be more structurally sound, whereas lower molecular weight polymers tend to be less rigid and more flexible.

In general, the amount of $H_3PO_4$ or other electrolyte active species to be added to the polymer binder will vary, depending on the desired end properties of the electrolyte. For example, when the molar ratio of acid to repeating unit of polymer (moles of $H_3PO_4$ to $PVA_n$) is less than 0.25, the conductivity of the resulting electrolyte is between about $1\times10^{-8}$ and $1\times10^{-5}$ Siemens per centimeter (S/cm). When the ratio is between 0.25 and 0.7, the conductivity of the resulting electrolyte increases to about $1\times10^{-5}$ to $1\times10^{-3}$ S/cm. At ratios above 0.7, the conductivity of the electrolyte is greater than $1\times10^{-2}$ S/cm, and begins to approach that of a pure acid. Molar ratios of acid to repeating unit of the polymer is in the he range of 0.1 to 2.0 have been found to be useful with a value near 0.5 being preferred. Expressed another way, the acid content of the solid polymer electrolyte can be between 1% and 70% by weight.

Figure 2:
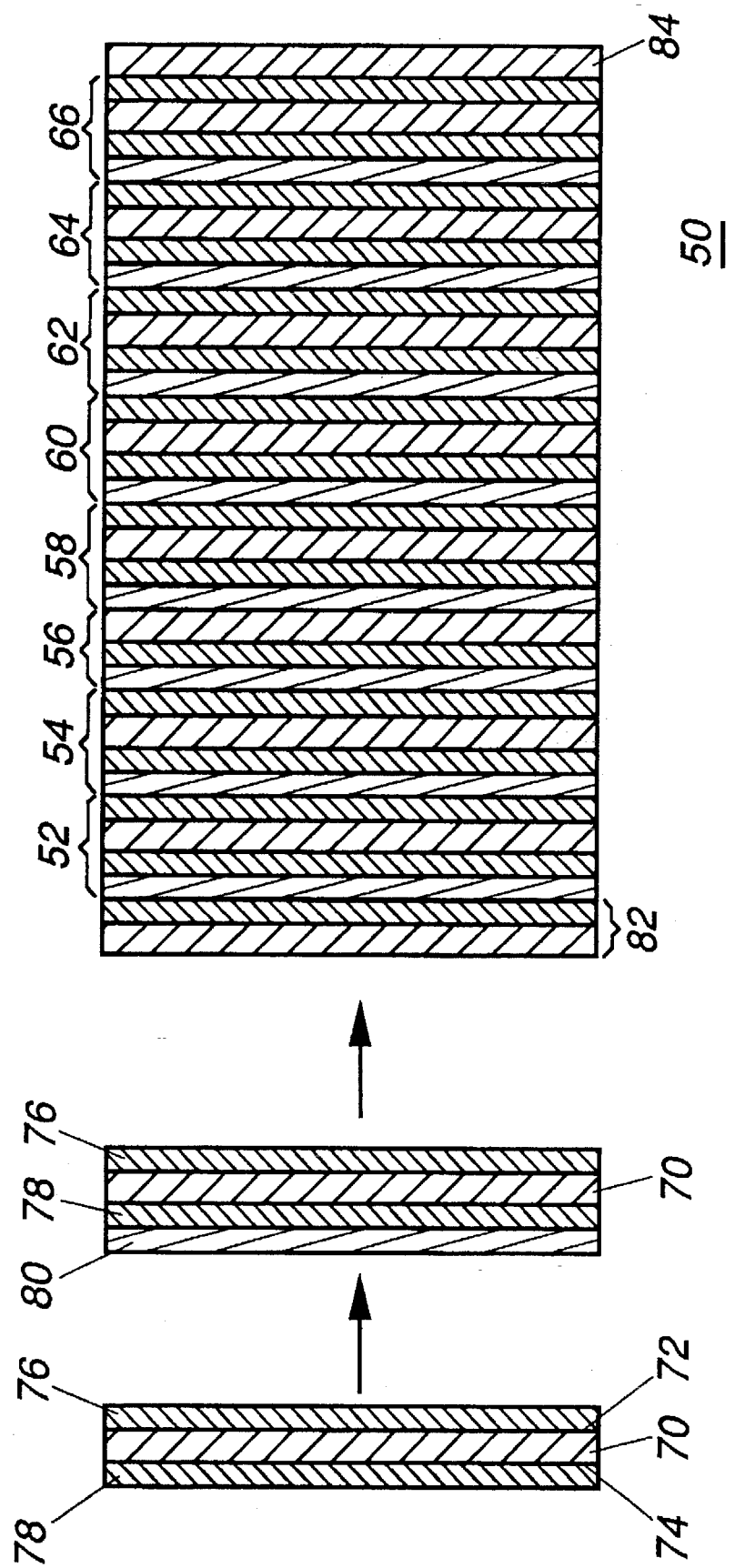
FIG. 2 is a schematic representation of a bipolar structure for an electrochemical capacitor in accordance with the instant invention.

Referring now to FIG. 2, there is illustrated therein a bipolar structure for a plurality of electrochemical devices such as those illustrated in FIG. 1, and arranged in a stacked configuration. As illustrated in FIG. 2, the bipolar structure 50 includes eight (8) discrete devices, 52, 54, 56, 58, 60, 62, 64, and 66, arranged in stacked configuration. Each repeating unit is substantially identical; hence, only device 52 will be described in detail. The device 52 is an electrochemical capacitor subassembly which comprises a metal foil substrate 70 fabricated of, for example, nickel, silver, copper, titanium, stainless steel, platinum, aluminum, gold, alloys thereof, and combinations thereof. The metal foil substrate 70 has first and second major surfaces, 72, 74, upon which are deposited, symmetric inorganic electrodes 76, 78. Hence, layers 76 and 78 are fabricated of the same inorganic material, such as, for example, oxides of ruthenium. Disposed atop electrode layer 78 is a layer of the solid electrolyte material 80, such as that described hereinabove.

Each of the electrochemical capacitor subassemblies are then arranged in stacked configuration with current collecting end plates 82 and 84 disposed at either end of the stacked assembly. It may be appreciated that the electrochemical performance of a bipolar structure such as that illustrated in FIG. 2 will depend upon the number of devices arranged in stacked configuration.

Figure 3:
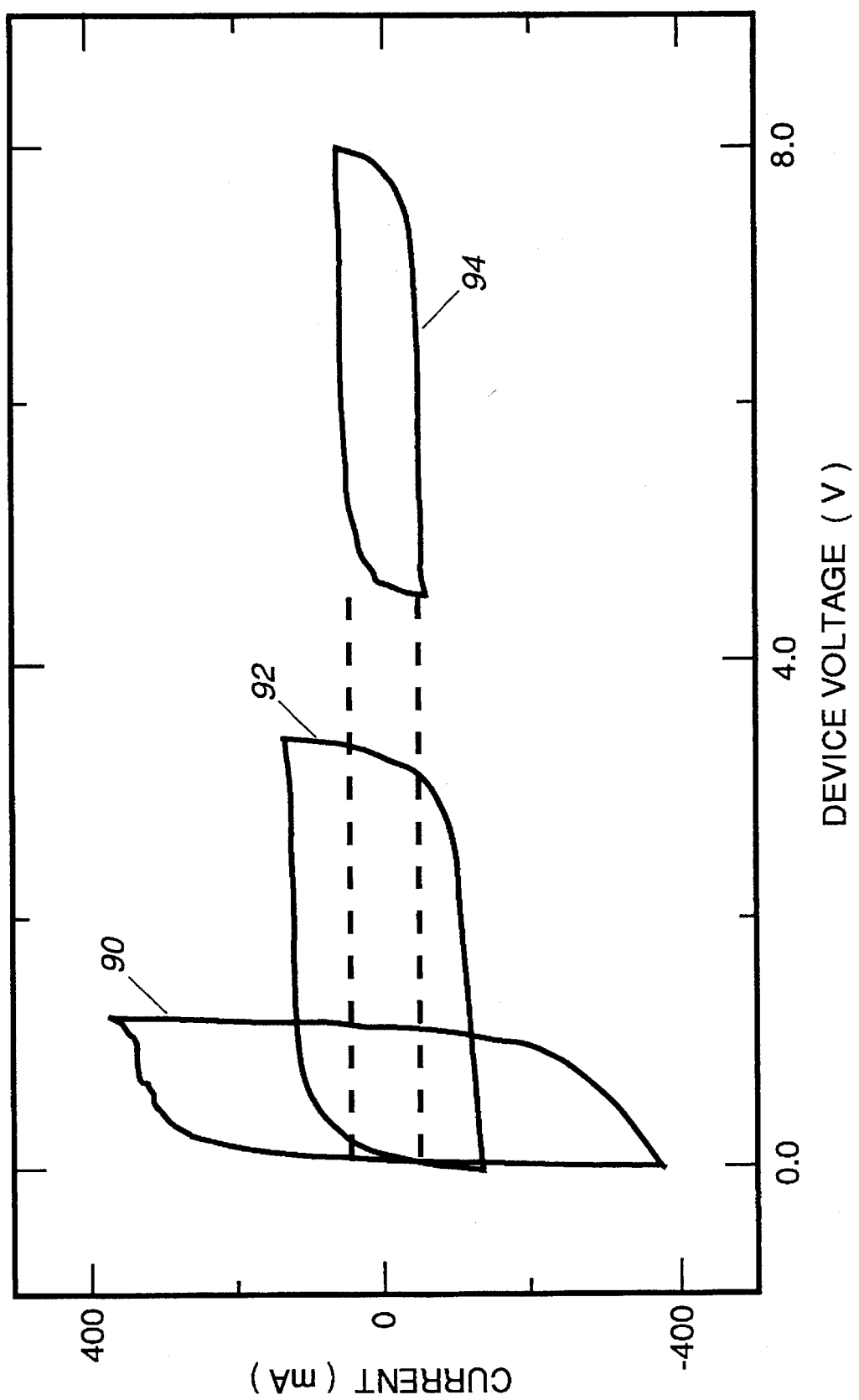
FIG. 3 is a series of cyclic voltammagram curves illustrating the performance of various electrochemical capacitor devices in accordance with the instant invention.

Referring now to FIG. 3, there is illustrated therein cyclic voltammagram curves for bipolar structures fabricated in accordance with the instant invention. The bipolar structures were fabricated in accordance with the embodiment illustrated in FIG. 2, and include symmetric ruthenium oxide ($RuO_2$) electrodes, with an electrolyte comprising a PVA polymeric support structure and phosphoric acid as the electrolyte active species. The cyclic voltammagram illustrated in FIG. 3 plots device voltage on the ordinate versus current in milliamperes on the abscissa. The cyclic voltammagram illustrated by curve 90 is characteristic of the electrochemical performance by a single cell device fabricated as described herein. The cyclic voltammagram illustrated by curve 92 is representative of the electrochemical performance of three subassemblies arranged in stacked configuration as described hereinabove, while the cyclic voltammagram illustrated by curve 94 demonstrates the electrochemical performance of seven subassemblies ranged in stacked configuration. The scan rate of these CV curves is 10 V/sec and yield CV curves which are well shaped, i.e., are highly symmetric curves indicating devices delivering high power, and which are highly reversible, i.e, a fast device. As the capacitance of bipolar devices is inversely proportional to the number of cells, the current of seven cell device as illustrated by curve 94 is approximately equal to one-seventh of a single cell device indicating that the performance of the device disclosed herein is in agreement with theoretical predictions. The symmetric devices described in this Example yield cyclic voltammagrams which have mere image components. Mere image cyclic voltammagrams indicate material devices which have high rate, that is respond quickly, and wherein voltage is limited, power is high. Moreover, the devices are relatively simple to manufacture as the layers are all essentially solid or thin films, thus avoiding the problems adherent in the prior art. Further, as the layers are all thin films, it is substantially easier to avoid problems with electrode series resistance ("ESR"). Lower ESR results in better devices which perform more efficiently.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical capacitor cell comprising:

an anode and a cathode comprising one or more materials selected from the group of Ru, Ir, Co, W, V, Fe, Mo, Ag, alloys thereof, oxides thereof and wherein the material for the anode and cathode is the same; and;

a polymer electrolyte in contact with and disposed between said anode, and said cathode, said polymer electrolyte comprising a polymeric support structure selected from polyvinyl alcohol, polyethylene oxide, polyvinyl alcohol, polyvinyl acetate, polyacrylamide, poly(vinyl pyrolidone), poly(2-vinylpyridene) poly(4-vinyl pyridene) and polyethylene imine and having dispersed therein a proton conducting electrolyte active species selected from the group of $H_3PO_4$, and $H_2SO_4$.

2. An electrochemical capacitor as in claim 1, wherein said capacitor is characterized by an oxidation/reduction charge storage mechanism.

3. An electrochemical capacitor as in claim 1, wherein said anode and said cathode are both fabricated of $RuO_2$.

4. An electrochemical capacitor as in claim 1, wherein said electrolyte is polyvinylalcohol having $H_3PO_4$, disposed therein.

5. An electrochemical capacitor device characterized by an oxidation/reduction charge storage mechanism, comprising a pair of symmetric, inorganic electrodes fabricated of a material selected from the group of Ru, Ir, Co, C, FeS, $Mo_2N$, W, V, and oxides thereof, and a polymer electrolyte consisting of $H_3PO_4$ dispersed in polyvinyl alcohol.

6. An electrochemical capacitor as in claim 5, wherein said anode and said cathode are both fabricated of $RuO_2$.

7. An electrochemical capacitor device comprising an anode and a cathode, each fabricated of an oxide of ruthenium, and having disposed therebetween a polymer electrolyte comprising a polymeric support structure fabricated of polyvinyl alcohol, and having dispersed therein a proton conducting electrolyte active species consisting of $H_3PO_4$.

8. An electrochemical capacitor device comprising a plurality of capacitor subassemblies arranged in stacked configuration, each said subassembly comprising an anode and a cathode fabricated of one or more materials selected from the group of ruthenium, iridium, cobalt, tungsten, vanadium, iron, molybdenum, alloys thereof, and oxides thereof, and combinations thereof; and a polymer electrolyte comprising a polymeric support structure selected from the group of polyvinyl alcohol, polyethylene oxide, polyvinyl acetate, polyacrylamide, poly(vinyl pyrolidone), poly(2-vinylpyridene) poly(4-vinyl pyridene) and polyethylene imine and having dispersed therein a proton conducting electrolyte active species selected from the group of $H_3PO_4$ and $H_2SO_4$.

* * * * *